Patented July 25, 1944

2,354,495

UNITED STATES PATENT OFFICE 2,354,495

DEHYDRATION PROCESS

Paul H. Bodenstein, New York, N. Y., assignor to Joseph Haimowitz and Joseph D. Shifrin, both of New York, N. Y.

No Drawing. Application December 29, 1942, Serial No. 470,452

4 Claims. (Cl. 99—199)

The present invention relates to a dehydration process and more particularly to a method for driving out moisture from foodstuffs.

An object of this invention is to provide a novel and improved process for the dehydration of vegetables, meat, fish and other similar food products, which is inexpensive, comparatively quickly performed, easy to practice, and requires very simple apparatus.

A further object hereof, is to provide a novel and improved dehydrating process of the character mentioned, which offers great ease of control over the percentage of moisture it is desired to remain in the finished dehydrated product.

Another object of this invention is to provide a novel and improved process of the type set forth, which imparts to the food stuff a property making it resistant to deterioration in storage.

A further object of the present invention is to provide a novel and improved dehydrating process of the class described, by which food products have their moisture content driven off, and are in turn impregnated and coated with a protective and preservative substance which is itself a constituent of food.

Still another object hereof is to provide a novel and improved method to rid various food products, which in many instances may be raw, or partially or completely cooked, from as much as may be desired of their water content, which is efficient in its performance.

Other objects and advantages will become apparent as this disclosure proceeds.

In the practice of this invention, solid food stuffs, which may be in the raw state, or else, partly or wholly cooked, are placed in a perforated receptacle within a heated bath of a chemical compound maintained at a temperature at or above the vaporization of water. The compound comprising the bath is of edible nature, which will become impregnated in the food stuff as the water content of said food treated, is vaporized, and upon rehydration of said food stuff when intended for use, the nature of the compound is such that it will form a colloidal dispersion of itself in the water adsorbed by the food stuff during rehydration thereof. The dehydration is continued for such period of time until the foodstuff is entirely rid of its water, or its residual water content has been reduced to any desired point, any condition of which is determinable by test of a sample taken from the food while in the bath or by a time factor determinable by previous experiment.

Such results and characteristics are obtainable when the substance used for the bath is a chemically neutral compound consisting of a partially saturated ester of an aliphatic polyhydric alcohol and an aliphatic monocarboxylic acid in molecular quantities insufficient to combine with all the hydroxyl radicles in the polyhydric alcohol, as propylene glycol monostearate, propylene glycol mono-palmitate, glycerol monostearate, glycerol distearate, glycerol monopalmitate, glycerol dipalmitate, for example. The bath may be of any one of said compounds, or of mixtures of two or more of them.

The following examples are given:

Example 1.—Lean pork is cut into one inch cubes and pre-cooked. Then they are immersed in a bath of molten glycerol monostearate at a temperature from about 218 degrees Fahrenheit to 228 degrees Fahrenheit, from three-quarters to one and a half hours, or for such a time as is sufficient to decrease the moisture content of the meat to that desired, i. e., 1% to 10%.

Example 2.—A quantity of precooked pea beans are immersed in a molten bath of propylene glycerol monopalmitate at a temperature from about 220 degrees Fahrenheit to 230 degree Fahrenheit for from twenty-five to forty-five minutes, or for such time sufficient to decrease the moisture content of the beans to the desired percentage content; forty minutes of treatment as set forth being sufficient to remove about 95% of the water content.

Example 3.—Raw lean beef is diced into one inch cubes and then subjected to a bath of molten glycerol monooleate maintained at a temperature of from about 218 degrees Fahrenheit to 228 degrees Fahrenheit, for two hours, for practically complete dehydration.

The practice of this invention is possible with numerous compounds suitable for the bath and for all sorts of solid food products. It is therefore intended and desired that the specific description herein be deemed illustrative and not restrictive, and that the patent shall cover all patentable novelty herein disclosed; reference being had to the following claims, rather than to the specific description herein to indicate the scope of this invention.

I claim:

1. In a process for dehydrating a solid foodstuff, the heating of same in a bath comprising a molten chemically neutral compound consisting of a partially saturated ester of an aliphatic polyhydric alcohol and an aliphatic monocarboxylic acid in molecular quantities insufficient to combine with all the hydroxyl radicles in the polyhydric alcohol, for a time and at a temperature sufficient to vaporize part or all of the water contained in the foodstuff.

2. A process as defined in claim 1, wherein the bath is propylene glycol monostearate.

3. A process as defined in claim 1, wherein the bath is glycerol monostearate.

4. A process as defined in claim 1, wherein the bath is propylene monooleate.

PAUL H. BODENSTEIN.